Oct. 18, 1966
H. N. JAMES
3,279,601
CORN HUSK AGITATOR
Filed Sept. 1, 1964
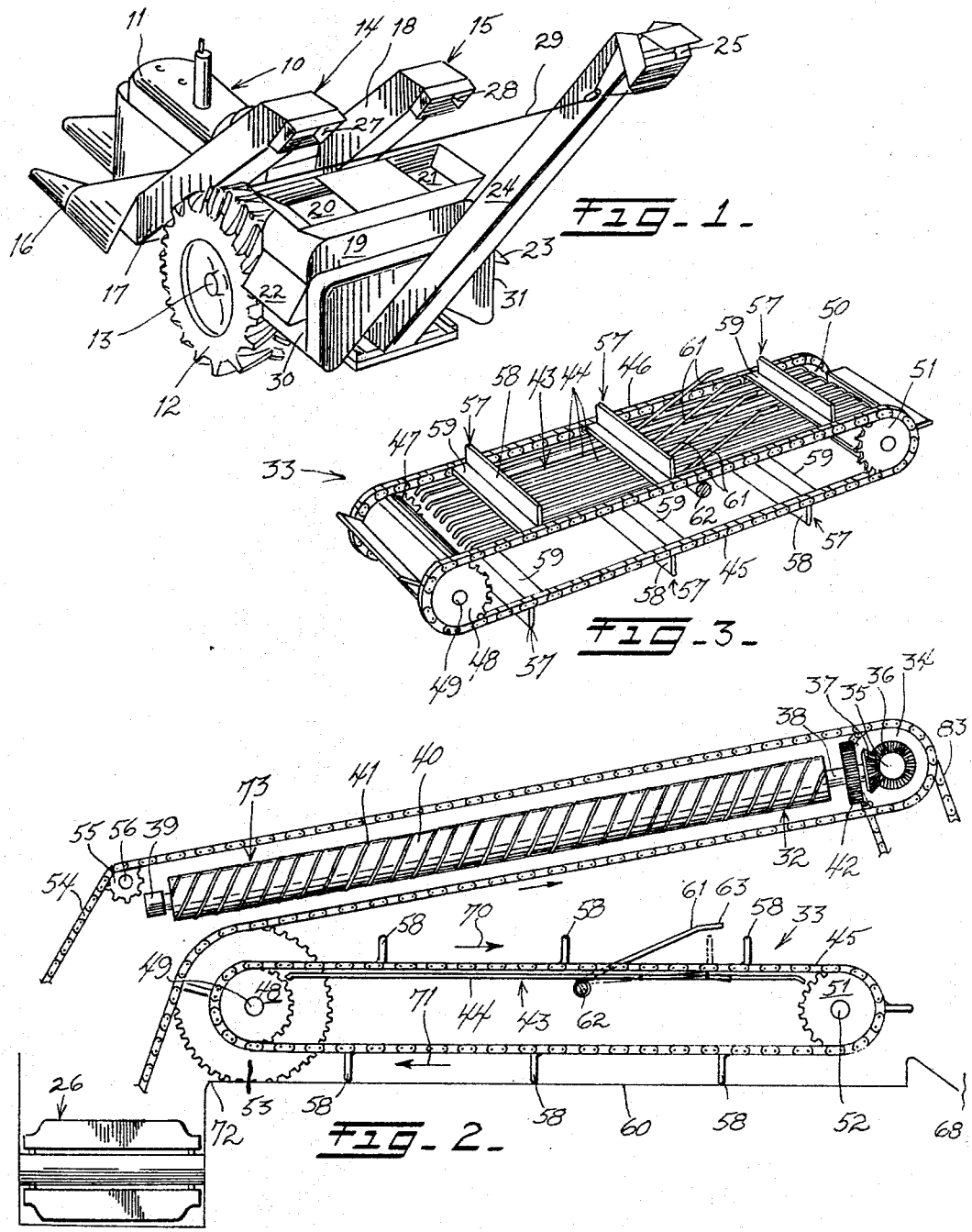
INVENTOR
HOWELL N. JAMES
BY
ATT'Y

3,279,601
CORN HUSK AGITATOR
Howell N. James, Moline, Ill., assignor to International Harvester Company, Chicago, Ill., a corporation of Delaware
Filed Sept. 1, 1964, Ser. No. 393,580
4 Claims. (Cl. 209—99)

The instant invention relates to corn harvesting. More particularly the invention relates to corn husking. Specifically, the invention relates to a process and device for recovery of shelled corn which has become separated from cobs and entrapped in husks during mechanical husking.

A corn harvester normally comprises a mobile frame provided with means at the forward end for detaching ears of corn from standing stalks. The detached ears in husk covered condition are normally fed rearwardly in the frame to a crop-treating unit, in most cases a husking unit. A husking unit comprises a husking mechanism conventionally characterized by one or more pairs of cooperating husking or husk removing rolls which operate to grasp husks from husk covered ears of corn and to drive them downwardly beneath the rolls on or into a mechanism which carries the removed husks from the husking unit and ejects them from the harvester.

The corn which is husked remains on top of the husk removing rolls and is carried to a wagon elevator. The elevator conveys the husked corn out of the harvester into a collector or wagon which in ordinary practice follows the harvester.

During the husking operation kernels of corn which have become separated from corn cobs become entrapped in the husks which are to be ejected from the harvester as waste. Inasmuch as such shelled or separated corn is valuable, it is desirable to remove or recover such separated and entrapped kernels from the husks to the extent that such recovery can be done economically. For that purpose, shelled corn saving devices previously have been devised which, for example, beat husks in an endeavor to liberate therein or thereby entrapped shelled kernels. However, recovery of shelled corn employing prior devices produces yields far below complete recovery of available kernels because of insufficient agitation to liberate more than a small amount of the shelled corn.

However, by increasing or changing the nature of husk agitation, improved yields can be available.

In accordance with the instant invention, and as a primary object thereof, there is provided an improved process and device for saving shelled corn which has become separated from cobs and entrapped in husks removed during husking operations.

A feature of the improved device comprises means for agitating husks with entrapped shelled corn by shaking the husks to thereby cause such entrapped kernels to be liberated and fall freely away from the husks.

Another feature of the invention comprises a plurality of spring members characterizing the husk agitator and which act as a catapult to toss from and shake removed husks above a conveyor bed over which such husks are carried. Thereby shelled kernels entrapped in such husks during the husking operation are dislodged therefrom and fall freely.

Another feature of the improvement is its novel sweeping mechanism for recovery of the shelled corn which has been separated from the removed husks. The mechanism comprises the transverse conveyor slats employed in the second run to convey such shelled corn away from the husks from which they have been removed.

Characteristic of the invention is the simplicity of the construction by reason of which improved recovery of shelled corn from husks removed in husking is obtained over yields procured using prior devices. Furthermore, the cost of recovery is thereby reduced compared to recovery costs using prior devices.

These and other objects, features and advantages of the present invention will become more apparent upon consideration of the following description and appended claims, when considered in conjunction with the accompanying drawings, wherein the same reference character or numeral refers to like or corresponding parts throughout the several views.

On the drawings:

FIG. 1 is a rear perspective view of a tractor and corn harvester assembly.

FIG. 2 is a rear elevational view of the husking mechanism and associated shelled corn saving device, parts of the chain drive mechanism being broken away in the interest of conservation of drawing area.

FIG. 3 is a rear perspective view of the shelled corn saving device.

Referring now more particularly to the drawings, there is shown in FIG. 1 a corn harvester assembly which includes a tractor generally designated by the numeral 10. The tractor has an elongated body 11 which is carried on a pair of large rear traction wheels 12, only one of which is shown in the drawings, and a pair of front supporting wheels (not shown). The wheels 12 are mounted in a conventional fashion on opposite end portions of an axle 13 which is operably connected in any suitable fashion to the drive transmission mechanism (not shown).

The harvester comprises a pair of downwardly and forwardly extending harvester row units 14 and 15 which are disposed on opposite sides of the tractor body 11 between the respective left and right wheels 12 and said body 11. Each row unit includes a gathering and picking or severing mechanism for aggressively detaching ears of corn from the stalks which are contained in housings 16, only one of which is seen in the drawings.

The row units 14 and 15 also include "first" elevators (not seen) which are disposed within respective elevator housings 17 and 18. Elevator housings 17 and 18 provide respective top openings 27 and 28 at their upper discharge ends from which picked ears of corn are discharged. The discharged ears of corn fall into a casing 19 which houses the husking mechanism, to be hereinafter described, through respective housing openings 20 and 21 which are aligned with the openings 27 and 28, respectively.

Additionally, the housing 19 has a pair of husk-ejection slots or openings at opposite sides thereof through which husks removed from the ears of corn are ejected from the housing 19. Said husk ejection slots or openings are obscured in FIG. 1 of the drawing by hoods 22 and 23 which are disposed above said husk ejection openings. However, one of said husk ejection openings 68 is shown partially in FIG. 2.

A wagon elevator housing 24 extends upwardly and rearwardly from the tractor 10. It is connected to frame 11 in any suitable or convenient fashion. The elevator housing 24 encases a wagon elevator 26, only a portion of which is seen in the drawings, in FIG. 2. Said elevator 26 may be of any conventional construction well known in the art for movement of husked ears upwardly to a discharge end or opening 25 from which such ears of corn spill into a wagon (not shown) which may trail the harvester 10. As illustrated in FIG. 1, a suitable guy 29 extends from the wagon elevator casing 24 to frame 11.

To this point the various identified elements and components have been described but generally as they comprise conventional or already known structures, and therefore the details of construction are not critical to the invention.

Referring now once again to the drawings, it is observed that the wagon elevator 26, heretofore described as being enclosed within the casing 24, is disposed substantially midway between sides 30 and 31 of the husking mechanism housing 19. A husking mechanism, generally designated in FIG. 2 by the numeral 32, and an associated shelled corn saving mechanism, generally designated in FIG. 2 by the numeral 33, are disposed at each side of the wagon elevator 26. In FIGS. 2 and 3 of the drawings, only the husking mechanism 32 and the shelled corn saving mechanism 33 disposed to the right side of the elevator 26 when viewed from the rear of tractor 10 are disclosed, as the details of construction for the opposite mechanisms (not shown) are substantially the same as those seen in the drawings.

Now then, attention is invited to FIG. 2, which discloses a sprocket chain 83 in part. Said chain 83 comprises a plurality of connected together links and which may be operably connected to the power supply source of tractor in 10 in any suitable or conventional fashion well known to those skilled in the art. The sprocket chain 83 drives a sprocket wheel which is obscured in the drawings and which is rigidly secured to a shaft 35 in any suitable manner whereby said shaft is rotated with said sprocket chain 83. The shaft 35 also has rigidly secured thereon by suitable means a second sprocket whel 34 for which said shaft 35 provides a fixed axis of rotation. Also secured on the shaft 35 and rotatable therewith is a bevel gear 36. Bevel gear 36 meshes with a bevel gear 37 which is rigidly secured on an outer end portion of a shaft 38. Shaft 38 is suitably journalled, by any conventional means, such as a journalling block 39 which is suitably supported in a fixed position within the casing 19. Accordingly, the shaft 38 is rotated by reason of a driving force transmitted through the link chain 83.

The longitudinal axis of the shaft 38 is disposed substantially at right angles to the longitudinal axis of the shaft 35. However, said shaft is angularly disposed within the husking mechanism casing 19 so that it slopes downwardly as it extends toward the center of the casing 19, as illustrated in FIG. 3.

The shaft 38 has rigidly secured thereon or carries a roll 40 which may be of hard rubber fabrication. The roll 40 is provided with a spiral flute or groove 41 which extends longitudinally of the roll 40. At least one other roll mounted on an adjacent shaft obscured in the drawings in FIG. 2 operates as a husk stripper in conjunction with the roll 40 in a conventional fashion; and by reason of the stripping action which occurs between roll 40 and the adjacent roll (not shown), the husking operation occurs. To the end that adjacent husking rolls (not shown) are driven, a spur gear 42 is rigidly secured on the shaft 38. Said spur gear 42 meshes with an adjacent gear (not shown) which is operably connected to drive associated shaft or shafts of such adjacent rolls (not shown).

The husked ears travel downwardly across the top of the roll 40 and the adjacent husking rolls (not shown) by reason of the inclination of the roll 40. When said husked ears reach the end of roll 40 they fall off the end thereof onto the wagon elevator 26 by which they are removed from the harvesting device.

The husks which are stripped from the ears of corn, on the other hand, are pulled between and below the roll 40 and its adjacent roll or rolls. The removed husks are then dropped from said husker 32 to a bed generally designated by the numeral 43 in FIG. 3.

The bed 43 is disposed in a preferably horizontal plane below the roller 40 and the associated husking rollers. Therefore, all removed husks will be deposited upon said bed 43. The bed 43 may be a grid comprising a plurality of rigid rods 44 or the like, only some of which have been numbered in FIG. 3. The rods 44 extend laterally from the elevator 26 or the longitudinal axis of said husking mechanism 32. Said rods 44 are spaced apart horizontally a distance sufficient to permit to fall therebetween loose kernels of corn.

The husk conveyor, which is combined with additional components that will be hereinafter described to provide the corn saving mechanism 33, comprises a pair of endless sprocket or conveyor chains 45 and 46. Said chains 45 and 46 are shown fabricated from conventional links and are disposed on opposite sides of the grid or bed 43, as illustrated in FIG. 3. The conveyor chains 45 and 46 rotate clockwise. By reason thereof the top run moves to the right with respect to FIG. 2, that is, in the direction of arrow designated 70; and the bottom run moves to the left with respect to FIG. 2, that is, in the direction of arrow designated 71.

A pair of sprocket wheels 47 and 48 which are spaced transversely of the bed or grid 43 supports and drives the chains 45 and 46 from one end thereof, as illustrated in FIGS. 2 and 3. Said sprocket wheels 47 and 48 are rigidly secured to a shaft 49 which provides for said sprocket wheels a common and fixed axis of rotation. The shaft 49 is journalled in any suitable fashion well known in the art within the casing 19. At the other end thereof the chains 45 and 46 are supported by sprocket members or wheels 50 and 51 which are spaced apart transversely of bed or grid 43, as illustrated in FIGS. 2 and 3. The sprocket members 50 and 51 are rotatable clockwise with respect to FIGS. 2 and 3 about a fixed axis of rotation provided by shaft 52 which is suitably journalled in any conventional fashion within the housing 19.

The sprocket members 50 and 51 are driven respectively by the endless sprocket chains 46 and 45, which in turn are driven by the sprocket members 47 and 48. To drive the sprocket members 47 and 48 a drive sprocket 53 may be rigidly secured or fast on the shaft 49 with which said drive sprocket 53 rotates. The drive sprocket 53 is engaged and driven by a link or sprocket chain 54 which transmits the torque of the hereinbefore defined sprocket wheel 34, as illustrated in FIG. 2.

Although sprocket chain 54 is shown broken, the links thereof are preferably connected together in an endless fashion whereby said chain 54 may drive an unseen sprocket wheel the torque of which may be transmitted through proper mechanical linkage to drive companion husking and corn saving components which normally would be disposed to the left of the elevator 26 shown in FIG. 2. Idler 55 serves to direct the course of the chain 54 downwardly as illustrated in FIG. 2. Said idler is rotatable about a fixed axis of rotation provided by shaft 56 which is suitably supported in any conventional fashion within the housing 19.

A plurality of elongated angular member or slats 57 are secured to the conveyor provided by the spaced apart chains 45 and 46 and extend transversely thereof. Said angular members or slats 57 are connected at their opposite ends to said chains 45 and 46, and they are disposed from each other in spaced apart relationship longitudinally of the path of the movement of the conveyor or chains 45 and 46. Each slat or angular member 57 comprises two portions. The first portion is an outwardly extending boss 58 (only some of which have been numbered in FIG. 3) which extends substantially perpendicularly to the plane of the path of movement of said chains 45 and 46. The second portion 59 extending at right angles to said bosses is disposed substantially in the plane of the path of movement of the conveyor comprised of the chains 45 and 46.

Bosses 58 which extend upwardly from the upper flight of the conveyor comprised of chains 45 and 46 sweep the husks from the surface of the grid or bed 43 downstream, i.e., to the right with respect to FIG. 1, into the husk ejection opening 68. By such means the separated husks which are dropped on bed or grid 43 are eliminated from the husking mechanism housing 19.

Now, the invention is characterized by a table or flat 60 which is provided in a fixed position within the housing 19. Said table or flat 60 is disposed below the lower course of the conveyor provided by the chains 45 and 46. The spacing of table 60 from the lower course of the husk conveyor is such that the bosses 58 will just about reach the flat 60, whereby shelled kernels of corn which have fallen through the grid or bed 43 will be swept to the left with respect to FIG. 2 and without being crushed. From the end of table or flat 60, the kernels of shelled corn will fall onto the wagon elevator 26 which will remove them from the housing 19.

The invention is further characterized by a plurality of elongated spring biased rods or finger-like spring members 61 which are disposed in spaced apart relationship transversely of the direction of the path of movement of the conveyor comprised of the endless chains 45 and 46. Preferably the lower end portion of the springs 61 are anchored on a fixed bar or arm 62 which is rigidly secured, by any convenient or suitable means, beneath the grid or bed 43. From their anchored position the springs extend longitudinally of the path of movement of the conveyor upwardly or through the grid 43 between grid or bed rods 44 toward the side 31 of the housing 19. Thereby a plurality of compressible fingers or springs capable of a rocking-like action about the bar or arm 62 are provided in the path of movement of the transversely disposed slats 57.

Now, inasmuch as the springs, rods or fingers 61 extend through the upper course of the conveyor provided by the chains 45 and 46 sloping upwardly in the path of the movement of said conveyor, they will be gradually compressed by the transverse members 57 as such members move along their normal path 70 in the upper course until the extreme normally upper end portions 63 of said fingers are pushed to the level of or submerged below the grid or bed 43 to the dotted line position illustrated in FIG. 2. As each successive slat portion 59 clears the end portions 63 of the fingers 61, said fingers 61 will decompress and spring back to the position shown in FIGS. 2 and 3 of the drawings.

Having thus described the details of construction of the device, a brief description of the operation thereof, partially in review, now ensues:

After severed corn has been delivered from row unit 15, for example, to the husking roll 40 and its companion roll or rolls, husks are stripped from the delivered ears. The stripped ears slide down the incline 73 provided by the downwardly slanting husking roll 40, as illustrated in FIG. 2, and such ears drop into the wagon elevator 26 which carries them out of the housing 19.

The husks, on the other hand, are carried through the husking mechanism 32 and drop on the fixed bed or grid 43. During the husking operation, however, not only are the husks removed from the ears of corn, but also kernels of corn are separated from the cobs. Such kernels become trapped within the husks which have fallen on the grid 43.

As the husks are moved downstream along the grid or bed 43 by the conveyor slats 57 which are carried downstream, that is, to the right with respect to FIG. 2 in the upper course of the conveyor, the conveyor slats 57 successively compress and release the springs, spring biased fingers or rods 61. As said springs, fingers or rods 61 are freed from engagement with successive of the moving transverse slats 57, they spring from compressed position and catapult, whip or fling the husks into the air.

The energy of compression which will be generated can be adjusted by the exercise of simple mechanical expedients well known in the art. The significant thing is the upon recoil or decompression of the springs or spring biased fingers or rods 61, the husks are flung or tossed upwardly and therefrom the entrapped kernels of corn are shaken loose and liberated. Much of the liberated shelled corn will fall freely to the grid or bed 43 and through the spaces between the rods 44 to the flat 60.

From flat 60, the shelled corn will be swept by bosses 58 into the wagon elevator 26.

It will be appreciated that as the husks are tossed upwardly they will also be thrown upstream in the upper course, i.e., to the left with respect to FIG. 2. Such action results from the torque of the springs 61 upon release or decompression. Therefore, by adjusting various physical characteristics of said springs 61, the distance that the husks will be tossed upwardly and downstream can be controlled. Accordingly, the extent of retreatment of husks, if any is required, can also be controlled to procure maximum recovery of shelled corn.

As many substitutions or changes could be made in the above described process and construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

I claim:

1. A device for separating shelled corn entrapped by husks during husking comprising:
   husk collecting and transporting means for collecting and conveying husk removed from ears of corn;
   means for separating the husk and the freed shelled corn comprising a grid through which the shelled corn falls; and
   means for tossing the husks upwardly and shaking free therefrom trapped shelled corn comprising a plurality of spring members extending upwardly from said grid.

2. The device defined in claim 1 in which the husk collecting and transporting means comprises a husk conveyor and a plurality of spring compression members connected to said conveyor.

3. The device defined in claim 2 in which the spring compression members extend transversely of said conveyor and sweep husks in one direction and sweep shelled corn in an opposite direction.

4. A device of the described class comprising
   an apertured bed adapted to support husks,
      the apertures in said bed of sufficient diameter to permit shelled corn to fall through said bed;
   a conveyor having a pair of courses disposed above and below said bed;
   a flat disposed below said bed and adapted to catch shelled corn which has fallen through said apertured bed;
   a plurality of bosses secured to said conveyor transversely of the path of movement thereof;
   a plurality of elongated spring-like members extending upwardly from said bed longitudinally of the path of movement of said bosses,
      said springs successively compressible by said bosses, whereby husks repeatedly are flung away from and fall back to said bed and are swept therefrom by said bosses in the upper conveyor course and shelled corn is carried by said bosses from said flat in the lower conveyor course.

References Cited by the Examiner

UNITED STATES PATENTS

| | | | |
|---|---|---|---|
| 2,080,717 | 5/1937 | Hitchcock | 130—5 |
| 2,298,198 | 10/1942 | Coultas | 130—5 |
| 2,419,898 | 4/1947 | Johnson | 130—5 |

M. HENSON WOOD, JR., *Primary Examiner.*

R. A. SCHACHER, *Assistant Examiner.*